United States Patent
Murayama et al.

(10) Patent No.: US 9,662,658 B2
(45) Date of Patent: May 30, 2017

(54) SHEET MANUFACTURING APPARATUS, PAPER SUPPLYING DEVICE, AND PAPER SHREDDING DEVICE

(71) Applicant: SEIKO EPSON CORPORATION, Tokyo (JP)

(72) Inventors: Yoshiaki Murayama, Shiojiri (JP); Seiichi Taniguchi, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/988,277

(22) Filed: Jan. 5, 2016

(65) Prior Publication Data

US 2016/0199847 A1 Jul. 14, 2016

(30) Foreign Application Priority Data

Jan. 9, 2015 (JP) .................................. 2015-002938
Nov. 6, 2015 (JP) .................................. 2015-218094

(51) Int. Cl.
B02C 18/00 (2006.01)
B65H 3/00 (2006.01)
D21B 1/08 (2006.01)

(52) U.S. Cl.
CPC ........... *B02C 18/0007* (2013.01); *B65H 3/00* (2013.01); *D21B 1/08* (2013.01); *B02C 2018/003* (2013.01); *Y02W 30/642* (2015.05)

(58) Field of Classification Search
CPC ............. B02C 18/00; D21D 1/02; B65H 3/00
USPC ......................................................... 162/261
See application file for complete search history.

(56) References Cited

U.S. PATENT DOCUMENTS

| 8,336,794 B2 | 12/2012 | Aries et al. |
| 8,496,197 B2 | 7/2013 | Aries et al. |
| 8,672,251 B2 | 3/2014 | Aries et al. |
| 8,882,965 B2 | 11/2014 | Yamagami et al. |
| 9,016,606 B1 | 4/2015 | Aries et al. |
| 9,194,081 B2 | 11/2015 | Yamagami et al. |

FOREIGN PATENT DOCUMENTS

| JP | 3105981 U | 9/2004 |
| JP | 2012-144819 | 8/2012 |
| JP | 2013-528481 | 7/2013 |
| JP | 2014-012277 | 1/2014 |
| JP | 2015-120163 | 7/2015 |

*Primary Examiner* — Mark Halpern
(74) *Attorney, Agent, or Firm* — Workman Nydegger

(57) ABSTRACT

A sheet shredding device includes a stacking unit configured to stack paper; a cutting unit configured to cut paper supplied from the stacking unit; a transferring unit configured to transfer paper from the stacking unit to the cutting unit; and removing units configured to remove a binder attached to the paper. The removing units are provided so as to overlap in a transfer direction of the paper along a transfer path of the paper from the stacking unit to the cutting unit.

8 Claims, 10 Drawing Sheets

SHEET MANUFACTURING APPARATUS, PAPER SUPPLYING DEVICE, AND PAPER SHREDDING DEVICE

BACKGROUND

1. Technical Field

The present invention relates to a sheet manufacturing apparatus, a paper supplying device, and a paper shredding device.

2. Related Art

In the related art, a paper recycling apparatus, in which waste paper is fed from an automatic feeding machine to a crushing machine, waste paper is cut into pieces of paper, the cut pieces of paper are defibrated, and paper is formed by a defibrated material that is defibrated, has been known (for example, see JP-A-2012-144819).

In addition, a paper shredding machine, which includes a cutter, a feeding device slot through which paper passes toward the cutter, and an edge provided to incline with respect to the feeding device slot, and in which a paper fastening device such as a staple is separated from one or several sheets of paper and paper is shredded, has been known (for example, see JP-T-2013-528481).

However, In the apparatus disclosed in JP-A-2012-144819, for example, if waste paper with a binder such as metal clip and a needle of a staple is fed into the crushing machine, there is a problem that crushing blades of the crushing machine are damaged.

In addition, in the paper shredding machine disclosed in JP-T-2013-528481, since only one edge is provided in a direction in which paper of the feeding device slot passes, for example, there is a problem that a binder cannot be removed depending on a size, a shape of the binder attached to paper, and the like, and an attached position of the binder to paper.

SUMMARY

The invention can be realized in the following aspects or application examples.

Application Example 1

According to this application example, there is provided a sheet manufacturing apparatus including: a stacking unit configured to stack a raw material containing fibers; a crushing unit configured to crush the raw material supplied from the stacking unit; a forming unit configured to form a sheet by using crushed pieces of the raw material that is crushed by the crushing unit; a transferring unit configured to transfer the raw material from the stacking unit to the crushing unit; and removing units configured to remove a binder bundling the raw material. The removing units are provided so as to overlap in a transfer direction of the raw material along a transfer path of the raw material from the stacking unit to the crushing unit.

In this case, These removing units are provided so as to overlap in the transfer direction of the raw material. Thus, an opportunity to remove the binder attached to the raw material is increased and it is possible to improve a binder removal rate from the raw material. Therefore, it is possible to reduce damage of the crushing unit and the like due to the binder. Moreover, the binder is a clip (for example, a clip mainly composed of resin and a clip mainly composed of cellulose) composed of a resin material that is thicker than paper, a metal clip, a needle of a staple, and the like, which are attached to collect waste papers of the raw material. In addition, it is also possible to apply to the raw material of the waste paper and the like that are bound by a so-called needle-free stapler. In this case, it is preferable that blades are formed in the removing units.

Application Example 2

According to this application example, there is provided a paper supplying device including: a stacking unit configured to stack paper; a transferring unit configured to transfer paper stacked in the stacking unit from the lowermost paper; and removing units configured to remove a binder attached to paper. The removing units are provided so as to overlap in a transfer direction of paper along a transfer path of paper by the transferring unit.

In this case, These removing units are provided so as to overlap in the transfer direction of paper. Thus, an opportunity to remove the binder attached to paper is increased and it is possible to remove the binders from paper more than the related art. Therefore, it is possible to supply paper from which the binders are removed to another unit or apparatus (for example, paper processing apparatus such as a shredder processing the paper, a recycling apparatus such as a sheet manufacturing apparatus using the paper as the raw material, and a paper consumption apparatus such as a printer using the paper as consumable goods).

Application Example 3

According to this application example, there is provided a paper shredding device including: a stacking unit configured to stack paper; a cutting unit configured to cut paper supplied from the stacking unit; a transferring unit configured to transfer paper from the stacking unit to the cutting unit; and removing units configured to remove a binder attached to paper. The removing units are provided so as to overlap in a transfer direction of paper along a transfer path of paper from the stacking unit to the cutting unit.

In this case, These removing units are provided so as to overlap in the transfer direction of paper. Thus, an opportunity to remove the binder attached to paper is increased and it is possible to remove the binders from paper more than the related art. In addition, it is possible to suppress damage of the cutting unit.

Application Example 4

In the sheet manufacturing apparatus, the paper supplying device, and the paper shredding device according to the application example, the removing units may be provided in a direction intersecting the transfer direction and alternately arranged.

In this case, the removing units are arranged without clearance to each other with respect to the raw material. Thus, it is also possible to remove the binders even in a center portion of the raw material.

Application Example 5

In the sheet manufacturing apparatus, the paper supplying device according to the application example, and the paper shredding device, the at least one removing unit may have a plurality of protrusions and at least one of the protrusions may be formed to abut the binder.

In this case, the protrusion enters between the binder and the raw material and it is possible to easily remove the binder. It is preferable that two or more protrusions are formed so as to abut the binder and in this case, multiple protrusions enter between the binder and the raw material, and easily remove the binder.

Application Example 6

In the sheet manufacturing apparatus, the paper supplying device according to the application example, and the paper shredding device, the at least one removing unit may have protrusions and the protrusions may be provided at a pitch of equal to or less than half an inner width of the binder.

In this case, the protrusion easily enters between the raw material and the binder, and it is possible to easily remove the binder.

Application Example 7

In the sheet manufacturing apparatus, the paper supplying device according to the application example, and the paper shredding device, a first removing unit and a second removing unit, which are arranged so as to overlap in the transfer direction, respectively may have protrusions, and the protrusions of the first removing unit and the protrusions of the second removing unit may be arranged so as to be alternately positioned.

In this case, the opportunity to remove the binder is further increased and it is possible to improve the binder removal rate from the raw material.

Application Example 8

In the sheet manufacturing apparatus, the paper supplying device, and the paper shredding device according to the application example, the removing units may be provided to incline in the transfer direction.

In this case, it is possible to remove the binder regardless of a fastening method (direction of the binder) of the binder with respect to the raw material.

Application Example 9

The sheet manufacturing apparatus (or the paper shredding device) according to the application example may further include a receiving unit configured to receive crushed pieces (pieces of paper that are cut by the cutting unit) crushed by the crushing unit; and a storage unit configured to store the binder removed by the removing units.

In this case, it is possible to separate the crushed pieces and the binder.

Application Example 10

In the sheet manufacturing apparatus, the paper supplying device according to the application example, and the paper shredding device, the removing units may be detachably fixed.

In this case, it is possible to replace the removing unit. For example, it is possible to perform maintenance such as replacement when the removing unit is damaged. In addition, the removing units having different shapes, materials, and the like are variously prepared, and it is possible to use the removing units by appropriate replacement.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, first to fourth embodiments of the invention will be described with reference to the drawings. Moreover, in each of the following views, scales of each member and the like are illustrated different from actual scales to make each member and the like be a recognizable size.

First Embodiment

First, a configuration of a paper shredding device will be described. The paper shredding device includes a stacking unit that stacks paper, a cutting unit that cuts paper supplied from the stacking unit, a transferring unit that transfers paper from the stacking unit to the cutting unit, and removing units that remove a binder attached to paper. A plurality of the removing units are provided so as to overlap in a transfer direction of paper along a transfer path of paper from the stacking unit to the cutting unit. Hereinafter, a specific configuration will be described.

Figure 1:
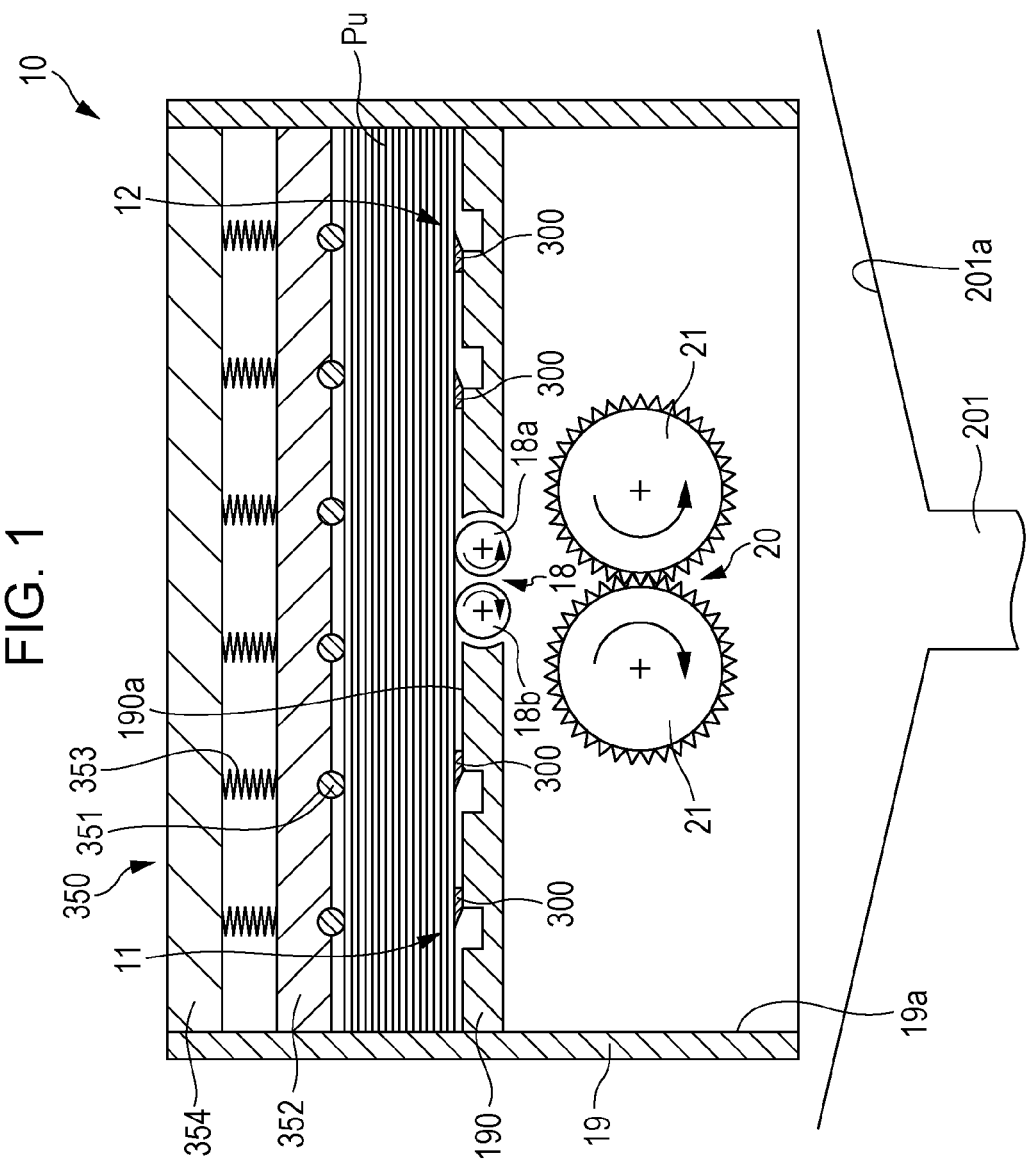
FIG. 1 is a schematic view illustrating a configuration of a paper shredding device according to a first embodiment.
Figure 2:
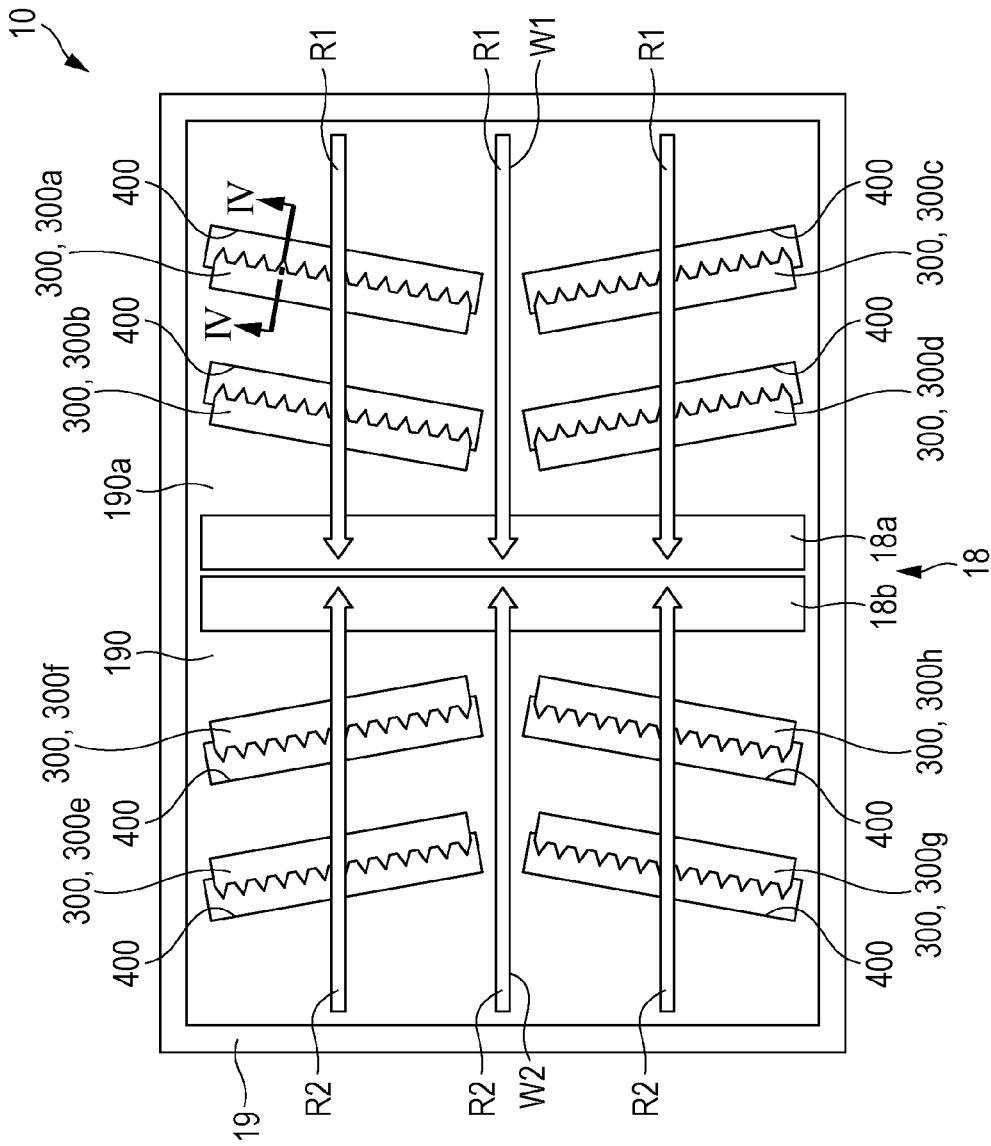
FIG. 2 is a schematic view illustrating the configuration of the paper shredding device according to the first embodiment.
Figure 3:
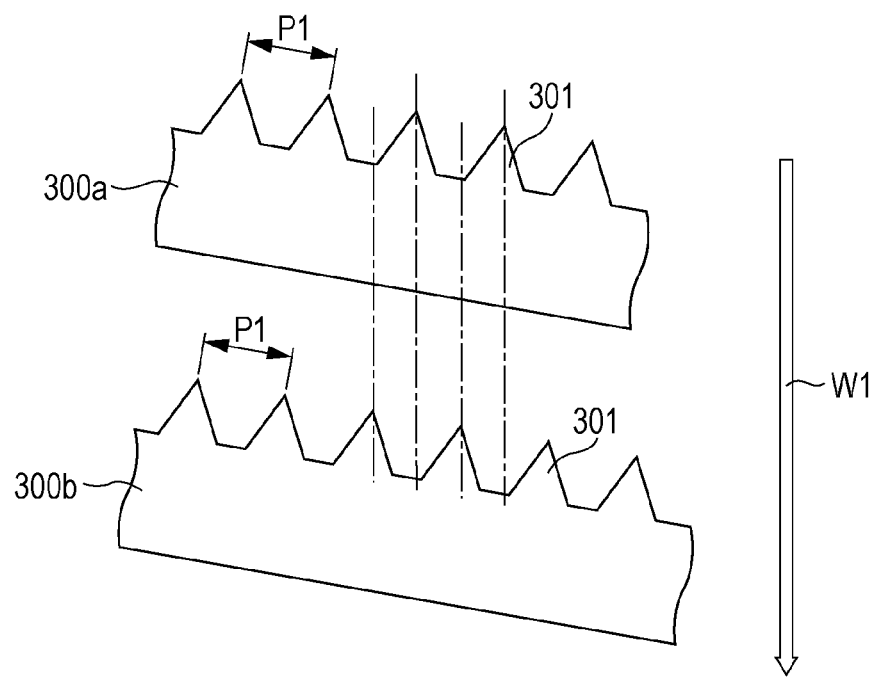
FIG. 3 is a schematic view illustrating a configuration of protrusions according to the first embodiment.
Figure 4:
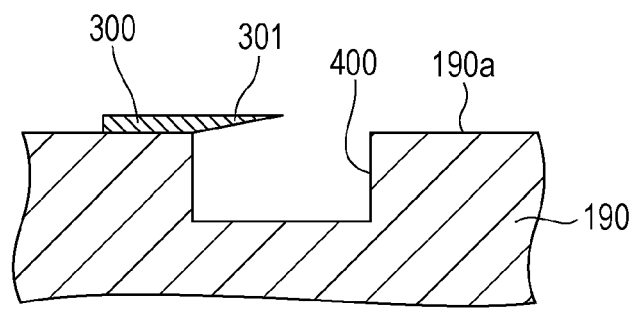
FIG. 4 is a sectional view illustrating a part of a configuration of a removing unit according to the first embodiment.

FIG. 1 is a schematic view (side sectional view) illustrating the configuration of the paper shredding device, FIG. 2 is a schematic view (plan view) illustrating the configuration of the paper shredding device, FIG. 3 is a schematic view illustrating a configuration of protrusions, and FIG. 4 is a sectional view illustrating a part of a configuration of a removing unit.

As illustrated in FIG. 1, a paper shredding device 10 includes a stacking unit 11, a supplying unit 12, a cutting unit 20, and the like. The paper shredding device 10 has a housing 19. In addition, a partition unit 190 for partitioning the housing 19 into an upper side and a lower side is provided within the housing 19. Then, a pressing unit 350 to be opened and closed is arranged on the upper side of the housing 19 and an opening port 19a is provided on the lower side of the housing 19.

The stacking unit 11 stacks paper Pu (may be waste paper Pu as a raw material containing fibers, hereinafter, described as the waste paper Pu) and the like. In the embodiment, a space provided between the partition unit 190 and the pressing unit 350 within the housing 19 corresponds to the stacking unit 11. The space, in which several to several hundred pieces of the waste paper Pu are stacked, is provided in the stacking unit 11. Then, the stacked waste paper Pu of the lowermost portion is mounted so as to follow a mounting surface 190a of the partition unit 190.

The pressing unit 350 presses the waste paper Pu mounted on the stacking unit 11 in the direction of gravity. The pressing unit 350 of the embodiment includes a plurality of pressing rollers 351 that come into contact with the waste paper Pu of the uppermost portion, which is mounted, a holding unit 352 that is connected to the pressing rollers 351 and holds the pressing rollers 351, spring units 353 as a biasing unit that biases the holding unit 352 in the direction of gravity, a cover unit 354 to which the spring units 353 are connected, and the like. The pressing unit 350 is configured to be opened and closed with respect to the housing 19. Then, the waste paper Pu is able to be loaded on the stacking unit 11 in a state where the pressing unit 350 is opened and the cover unit 354 is fixed to an upper portion of the housing 19 in a state where the pressing unit 350 is closed. Then, in a state where the waste paper Pu is mounted on the stacking unit 11, if the pressing unit 350 is in a closed state, the pressing rollers 351 press the waste paper Pu by a biasing force of the spring units 353.

The supplying unit 12 supplies the waste paper Pu of the raw material to the cutting unit 20. Then, the supplying unit 12 includes a pair of rollers 18 (18a and 18b) as a transferring unit transferring the waste paper Pu from the stacking unit 11 to the cutting unit 20. The pair of rollers 18 according to the embodiment are positioned in a center portion of the partition unit 190 and are arranged in a width direction of the loaded waste paper Pu. Here, the width direction of the loaded waste paper Pu is, for example, a lateral width (short side) direction in the waste paper Pu of an A4 size (see FIG. 2). Moreover, upper end portions of the pair of rollers 18 are arranged so as to come into contact with the loaded waste paper Pu of the lowermost portion. Then, in a state where the waste paper Pu is pressed in the direction of gravity by the pressing unit 350 with respect to the waste paper Pu loaded on the stacking unit 11, the loaded waste paper Pu of the lowermost portion follows the pair of rollers 18, the waste paper Pu is folded and passes through the pair of rollers 18, and then is transferred to the cutting unit 20 by driving the pair of rollers 18 to be rotated. Moreover, the number of sheets of the waste paper Pu passing through the pair of rollers 18 is not limited to one sheet and a plurality of the waste paper Pu may be transferred at once.

The cutting unit 20 includes crushing blades (cutting blades) 21 and cuts (crushes) the waste paper Pu supplied by the supplying unit 12 into the pieces of paper of, for example, several centimeters square. Thus, it is possible to easily cut the supplied waste paper Pu into the pieces of paper. The pieces of paper are stored in a storage unit (not illustrated) provided on the inside of the housing or the outside of the housing. Otherwise, the pieces of paper are temporarily stored in a receiving unit 201a of a hopper and the like, and are supplied from an outlet (pipe 201) to another unit or device (see a third embodiment described below).

Moreover, the supplying unit 12 includes removing units 300 for removing the binder that bundles the waste paper Pu. The removing units 300 are arranged in the mounting surface 190a. Here, the binder is, for example, a clip (for example, a clip mainly composed of resin and a clip mainly composed of cellulose) composed of a resin material, of which a thickness is thicker than paper, which is attached to collect the waste paper, a metal clip, a needle of a metal staple, and the like. Moreover, if the waste paper Pu is supplied from the stacking unit 11 to the cutting unit 20 in a state of being bound by the binder, there is a concern that the crushing blades 21 of the cutting unit 20 are damaged. Thus, before the waste paper Pu is supplied to the cutting unit 20, the binder attached to the waste paper Pu is removed by the removing units 300.

A plurality of the removing units 300 are provided so as to overlap from the stacking unit 11 to the cutting unit 20 in the transfer direction of the waste paper Pu along a transfer path of the waste paper Pu. Specifically, as illustrated in FIG. 2, the removing unit 300 has a substantially plate shape in a plan view and the plurality of the removing units 300 are arranged on the mounting surface 190a. In the embodiment, eight removing units 300 (300a to 300h) are arranged. Furthermore, in the eight removing units 300 (300a to 300h), the removing unit 300a and the removing unit 300b are arranged in a pair. In addition, the removing unit 300c and the removing unit 300d, the removing unit 300e and the removing unit 300f, and the removing unit 300g and the removing unit 300h are arranged respectively in pairs. Furthermore, specifically, the removing unit 300a is arranged on an upstream side in a first transfer direction W1 and the removing unit 300b is arranged on a downstream side of the removing unit 300a in the first transfer direction W1 so as to overlap in the first transfer direction W1 of the waste paper Pu along a first transfer path R1 of the waste paper Pu toward the pair of rollers 18. In addition, the removing unit 300c and the removing unit 300d are arranged in positions facing the removing unit 300a and the removing unit 300b in the first transfer direction W1. In addition, the removing unit 300e is arranged on an upstream side in a second transfer direction W2 and the removing unit 300f is arranged on a downstream side of the removing unit 300e in the second transfer direction W2 so as to overlap in the second transfer direction W2 that is a direction opposite to the first transfer direction W1 of the waste paper Pu along a second transfer path R2 of the waste paper Pu toward the pair of rollers 18. In addition, the removing unit 300g and the removing unit 300h are arranged in positions facing the removing unit 300e and the removing unit 300f in the second transfer direction W2.

Then, as illustrated in FIG. 2, the removing units 300 (300a to 300h) are provided to incline in the first and second transfer directions W1 and W2. Specifically, an end portion of each of the removing units 300 (300a to 300h) corresponding to a center portion of the partition unit 190 in a direction intersecting the first and second transfer directions W1 and W2 is inclined to be closer to the pair of rollers 18 than the other end portion thereof.

In addition, as illustrated in FIG. 3, the removing unit 300 has a plurality of protrusions 301 and at least one of the protrusions 301 is formed so as to abut the binder. Specifically, each protrusion 301 is formed on the upstream side in the first and second transfer directions W1 and W2. Thus, the protrusion 301 is likely to come into contact with the binder attached to the waste paper Pu and it is possible to increase a binder removal rate. In this case, it is preferable that the protrusions 301 are provided at a pitch P1 equal to or less than half an inner width of the binder. Thus, two or more protrusions 301 can come into contact with the binder and it is possible to increase the binder removal rate. Furthermore, as illustrated in FIG. 3, for example, the removing unit 300a as a first removing unit and the removing unit 300b as a second removing unit, which are arranged so as to overlap in the first transfer direction W1, are respectively the plurality of the protrusions 301, and are arranged such that the protrusions 301 of the removing unit 300a and the protrusions 301 of the removing unit 300b are alternately positioned in the first transfer direction W1. Thus, an opportunity that the binder comes into contact with the protrusions 301 of each of the removing units 300a and 300b is increased and it is possible to increase the binder removal rate.

In addition, as illustrated in FIG. 4, a storage unit 400 that stores the binders removed by the removing units 300 is provided. The storage unit 400 is a concave unit formed in the direction of gravity from the mounting surface 190a of the partition unit 190. Then, the storage unit 400 is provided corresponding to each of the removing units 300 (300a to 300h) on the upstream side in the first and second transfer directions W1 and W2. Thus, the binders removed by the removing units 300 fall in the direction of gravity and are stored in the storage unit 400. Thus, the binder is not transferred to the cutting unit 20 and it is possible to protect the crushing blades 21 of the cutting unit 20 and the like.

As described above, according to the embodiment, it is possible to obtain the following effects.

The plurality of the removing units 300 (300a to 300h) including the protrusions 301 are provided and the removing units 300 (300a to 300h) are arranged so as to overlap in the first and second transfer directions W1 and W2 of the waste paper Pu. Thus, the opportunity to remove the binder attached to the waste paper Pu is increased. Thus, it is possible to improve the binder removal rate from the waste paper Pu.

Second Embodiment

Next, a second embodiment will be described. Moreover, since a basic configuration of the paper shredding device according to the embodiment is the same as the paper shredding device 10 according to the first embodiment, description thereof will be omitted, and a configuration different from the configuration of the first embodiment, that is, an arrangement configuration of removing units will be described.

Figure 5:
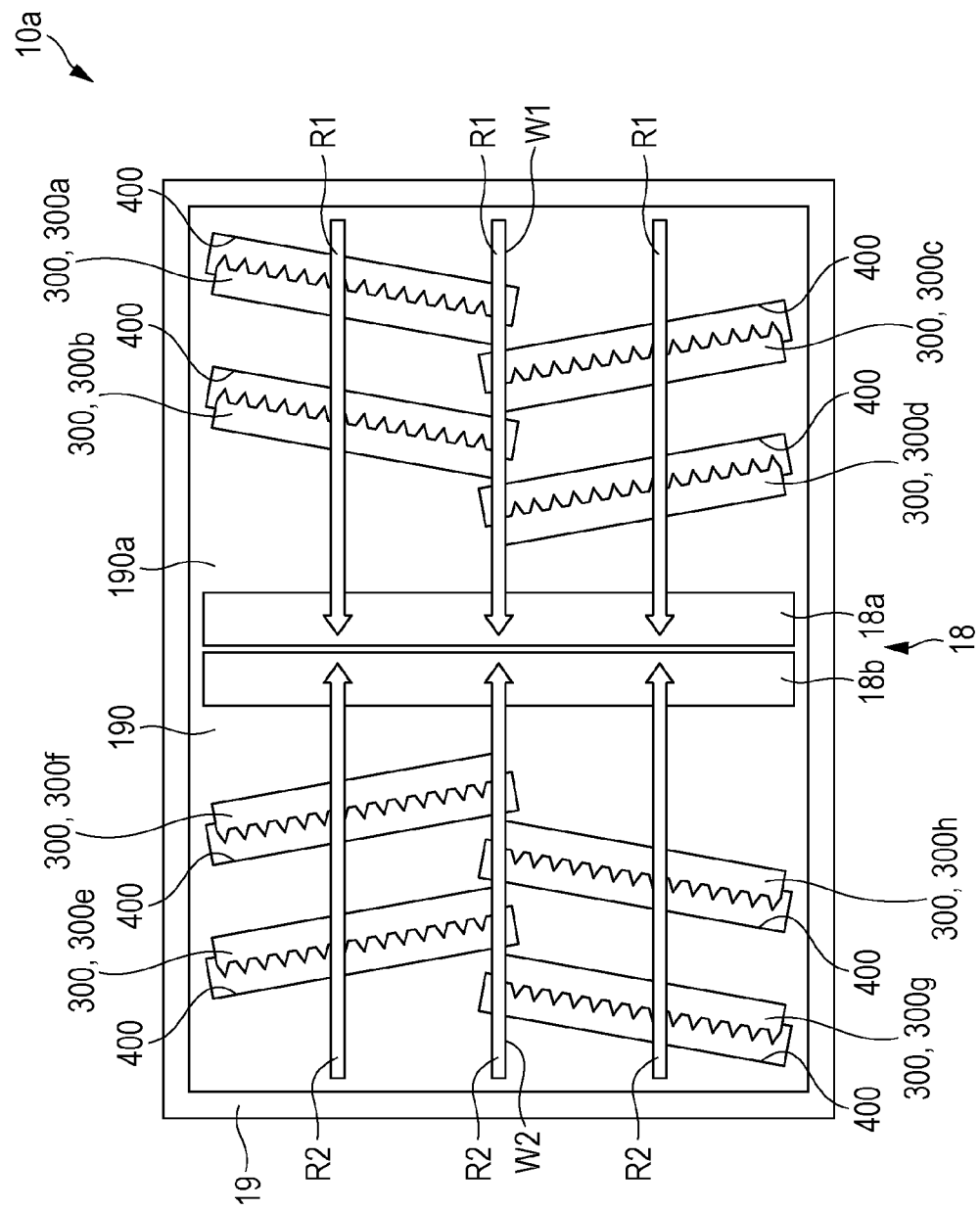
FIG. 5 is a schematic view illustrating a configuration of a paper shredding device according to a second embodiment.

FIG. 5 is a schematic view illustrating the configuration of the paper shredding device according to the embodiment and, more specifically, is a plan view illustrating an arrangement (array) of the removing units. Similar to the first embodiment, a paper shredding device 10a of the embodiment includes a stacking unit, a supplying unit, a cutting unit, and the like. Moreover, since these configurations are the same as the configurations of the first embodiment, the description will be omitted.

As illustrated in FIG. 5, in the paper shredding device 10a, a plurality of removing units 300 are arranged on a mounting surface 190a. In the embodiment, eight removing units 300 (300a to 300h) are arranged. Furthermore, in the eight removing units 300 (300a to 300h), the removing unit 300a and the removing unit 300b are arranged in a pair. In addition, the removing unit 300c and the removing unit 300d, the removing unit 300e and the removing unit 300f, and the removing unit 300g and the removing unit 300h are arranged respectively in pairs. The removing units 300a and 300b, and the removing units 300e and 300f are arranged in one region (upper half region in FIG. 5) that bisects the mounting surface 190a in transfer directions W1 and W2, and the removing units 300c and 300d, and the removing units 300g and 300h are arranged in the other region (lower half region in FIG. 5) that bisects the mounting surface 190a in the transfer directions W1 and W2. In addition, the removing units 300a and 300b, and the removing units 300c and 300d are arranged in one region (right side region from a roller 18a in FIG. 5) that bisects the mounting surface 190a in a direction orthogonal to the transfer directions W1 and W2, and the removing units 300e and 300f, and the removing units 300g and 300h are arranged in the other region (left side region from a roller 18b in FIG. 5) that bisects the mounting surface 190a in the direction orthogonal to the transfer directions W1 and W2. Furthermore, specifically, the removing unit 300a is arranged on an upper side in the first transfer direction W1 and the removing unit 300b is arranged on a downstream side of the removing unit 300a in the first transfer direction W1 so as to overlap in the first transfer direction W1 of the waste paper Pu along a first transfer path R1 of the waste paper Pu toward the pair of rollers 18. Similarly, the removing unit 300c and the removing unit 300d are arranged so as to overlap in the first transfer direction W1 of the waste paper Pu. In addition, the removing unit 300e is arranged on the upper side in the second transfer direction W2 and the removing unit 300f is arranged on the downstream side of the removing unit 300e in the second transfer direction W2 so as to overlap in the second transfer direction W2 opposite to the first transfer direction W1 of the waste paper Pu along a second transfer path R2 of the waste paper Pu toward the pair of rollers 18. Similarly, the removing unit 300g and the removing unit 300h are arranged so as to overlap in the second transfer direction W2 of the waste paper Pu.

Then, the removing units 300 (300a to 300h) are provided so as to overlap in the first and second transfer directions W1 and W2. Specifically, an end portion of each of the removing units 300 (300a to 300h) corresponding to a center portion of the partition unit 190 in a direction intersecting the first and second transfer directions W1 and W2 is inclined to be closer to the pair of rollers 18 than the other end portion thereof.

Furthermore, the plurality of the removing units 300 (300a to 300h) are provided in a direction intersecting the first and second transfer directions W1 and W2, and are alternately arranged. Specifically, the removing unit 300a, the removing unit 300c, the removing unit 300b, and the removing unit 300d are alternately arranged in this order from the upstream side to the downstream side in the first transfer direction W1. Then, end portions of the removing units 300 (300a to 300d) corresponding to the center portion of the partition unit 190 in the direction intersecting the first transfer direction W1 are respectively arranged so as to overlap in the first transfer direction W1 of the waste paper Pu.

Similarly, the removing unit 300g, the removing unit 300e, the removing unit 300h, and the removing unit 300f are alternately arranged in this order from the upstream side to the downstream side in the second transfer direction W2. Then, end portions of the removing units 300 (300e to 300h) corresponding to the center portion of the partition unit 190 in the direction intersecting the second transfer direction W2 are respectively arranged so as to overlap in the second transfer direction W2 of the waste paper Pu.

Moreover, since the configuration of the protrusions 301 forming the removing unit 300 are the same as the configuration thereof according to the first embodiment, the description will be omitted. In addition, similar to the first embodiment, a storage unit 400 storing the binder removed by the removing unit 300 is provided.

As described above, according to the embodiment, it is possible to obtain the following effects.

The plurality of the removing units 300 (300a to 300h) are provided in the direction intersecting the first and second transfer directions W1 and W2, and are alternately arranged. Thus, it is possible to remove the binder even if the binder is attached to the center portion of the waste paper Pu.

Third Embodiment

Next, a configuration of a sheet manufacturing apparatus will be described. The sheet manufacturing apparatus is, for example, based on a technique of forming a new sheet Pr by using a raw material (defibration object) Pu such as pure pulp sheets, waste paper, and the like. The sheet manufacturing apparatus according to the embodiment includes a stacking unit that stacks the raw material containing fibers, a crushing unit (cutting unit) that crushes the raw material supplied from the stacking unit, a forming unit that forms the sheet by using crushed pieces of the raw material that is crushed by the crushing unit, a transferring unit that transfers the raw material from the stacking unit to the crushing unit, and removing units that remove a binder bundling the raw material. A plurality of the removing units are provided so as to overlap in a transfer direction of the raw material along a transfer path of the raw material from the stacking unit to the crushing unit.

Hereinafter, the configuration of the sheet manufacturing apparatus will be described in detail.

Figure 6:
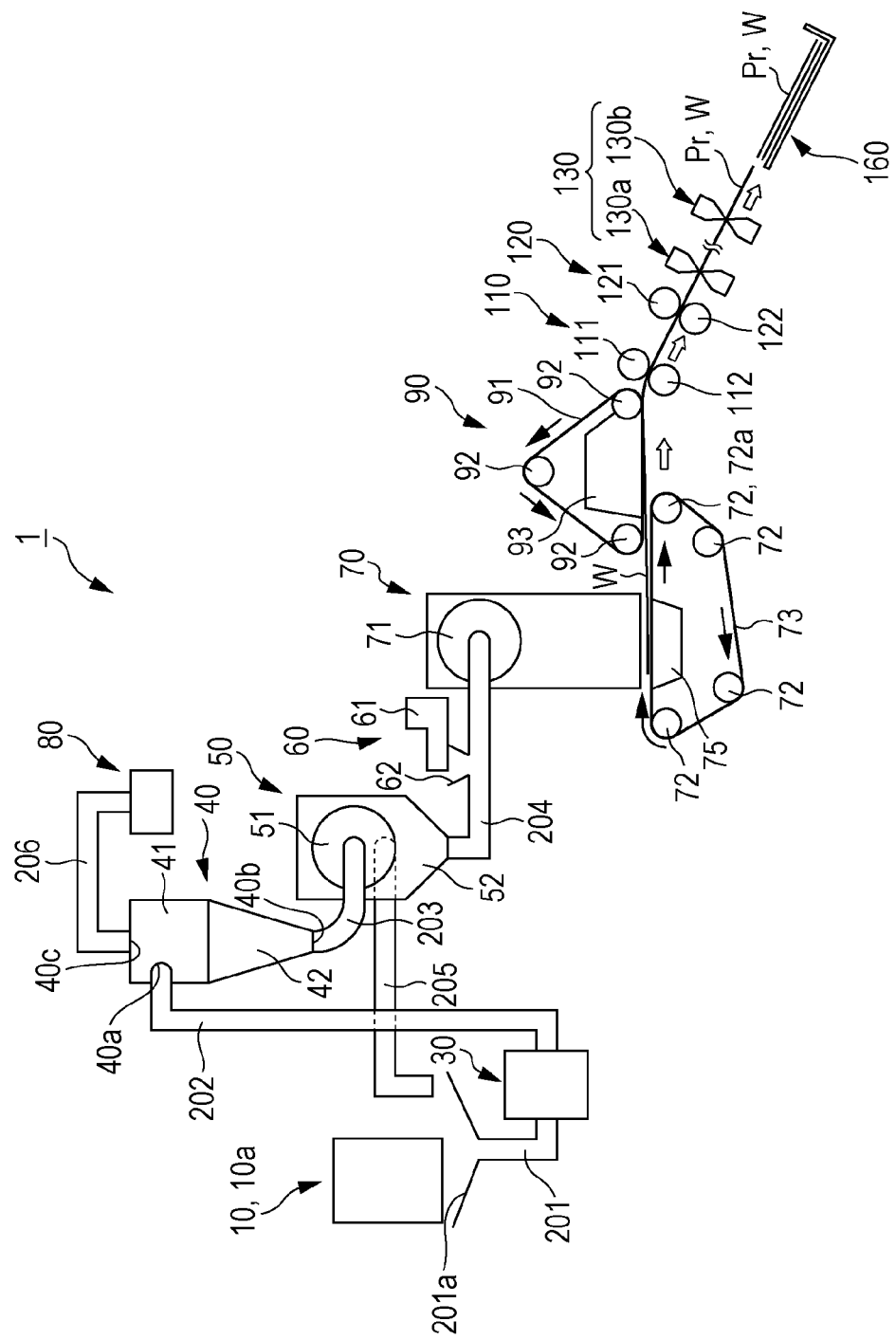
FIG. 6 is a schematic view illustrating a configuration of a sheet manufacturing apparatus according to a third embodiment.

FIG. 6 is a schematic view illustrating the configuration of the sheet manufacturing apparatus according to the embodiment. As illustrated in FIG. 6, a sheet manufacturing apparatus 1 of the embodiment includes a feeding unit 10, a defibrating unit 30 and a classifying unit 40 that form a forming unit, a screening unit 50, an additive agent feeding unit 60, a deposition unit 70, a heating and pressurizing unit 120, and the like. In addition, a control unit (not illustrated) that controls these members is provided.

Moreover, the feeding unit 10 of the embodiment applies the paper shredding device 10 according to the first embodiment. Thus, since the configuration of the feeding unit 10 is the same as the configuration of the paper shredding device 10, description of detailed configuration of the feeding unit 10 will be omitted.

The feeding unit 10 includes the supplying unit 12, the crushing unit 20 (cutting unit 20), and the like (see FIG. 1), supplies waste paper as the raw material, and crushes (cuts) the supplied waste paper into the pieces of paper of several centimeters square. Then, crushed pieces are received by a receiving unit 201a and are supplied to a defibrating unit 30 via a pipe 201 connected to the receiving unit 201a.

The defibrating unit 30 defibrates a material containing fibers in gas (hereinafter, referred to as in the air) in the air (in the atmosphere). The defibrating unit 30 includes rotary blades (not illustrated) that are rotated and performs defibration to disentangle the crushed pieces supplied from the crushing unit 20 to a fibrous shape. In the present application, a material that is defibrated by the defibrating unit 30 is referred to as a defibration object and a material that passes through the defibrating unit 30 is referred to as a defibrated material. Moreover, the defibrating unit 30 of the embodiment performs defibration in a dry type in the air. A coating material for paper such as ink, toner, and the blur-preventing agent to be printed becomes particles (hereinafter, referred to as ink particles) of several tens μm or less and is separated from the fibers by the defibrating process of the defibrating unit 30. Thus, the defibrated material exiting from the defibrating unit 30 is the fibers and the ink particles obtained by defibration of the pieces of paper. Then, the defibrating unit 30 is a mechanism that generates airflow by the rotation of the rotary blades and the fibers that is defibrated via a pipe 202 is transferred to the classifying unit 40 with the airflow. Moreover, an airflow generating device that generates the airflow for transferring the fibers, which are defibrated in the defibrating unit 30, to the classifying unit 40 via the pipe 202 may be separately provided as necessary.

The classifying unit 40 classifies an introduction material that is introduced by the airflow. In the embodiment, the defibrated material as the introduction material is classified into the ink particles and the fibers. The classifying unit 40 applies, for example, a cyclone and then can classify the transferred defibrated material into the ink particles and the fibers with the airflow. Moreover, another airflow type classifier may be used instead of the cyclone. In this case, as the airflow type classifier other than the cyclone, for example, elbow jet, eddy classifier, and the like are used. The airflow type classifier generates a whirling airflow and separates and classifies the defibrated material by a difference in a centrifugal force received by the size and density of the defibrated material. Thus, it is possible to adjust a classification point by adjusting a speed of the airflow and the centrifugal force. Thus, the defibrated material is separated into small ink particles of relatively low density and the fiber of high density having particles greater than the ink particles in size.

The classifying unit 40 of the embodiment is a tangential input type cyclone and is configured of an inlet 40a into which the introduction material is introduced from the defibrating unit 30, a cylindrical unit 41 to which the inlet 40a is connected in a tangential direction, a cone unit 42 that follows a lower portion of the cylindrical unit 41, a lower outlet 40b that is provided in a lower portion of the cone unit 42, and an upper discharge port 40c that provided in an upper center of the cylindrical unit 41 and discharges powder. A diameter of the cone unit 42 is decreased vertically downward.

In a classifying process, the airflow having the defibrated material introduced from the inlet 40a of the classifying unit 40 is changed to a circular motion in the cylindrical unit 41 and the cone unit 42, and is classified by applying the centrifugal force. Then, the fibers having high density, which are greater than the ink particles in size, are moved to the lower outlet 40b and the ink particles having low density are derived to the upper discharge port 40c with air as powder. Then, the ink particles exit from the upper discharge port 40c of the classifying unit 40. Then, the exited ink particles are recovered to a recovery unit 80 via a pipe 206 connected to the upper discharge port 40c of the classifying unit 40. On the other hand, the classified defibration object containing the fibers is transferred from the lower outlet 40b of the classifying unit 40 to the screening unit 50 via a pipe 203 in the air. The defibrated material may be transferred from the classifying unit 40 to the screening unit 50 by the airflow during classifying or may be transferred from the classifying unit 40 on the upper side to the screening unit 50 on the lower side by gravity. Moreover, a suction unit and the like may be arranged the upper discharge port 40c of the classifying unit 40 or a pipe 206 to efficiently suck a short-fiber mixture from the upper discharge port 40c. The classification is not performed exactly by a certain size and density as a boundary. In addition, the classification may not be performed exactly into the fibers and the ink particles. Relatively short fiber in the fibers exits from the upper discharge port 40c together with the ink particles. Relatively large fiber in the fibers exits from the lower outlet 40b to which the fibers.

The screening unit 50 screens the classified material (defibrated material) containing the fibers that are classified by the classifying unit 40 by containing the classified material to pass through a sieve unit 51 having a plurality of openings. Further specifically, the classified material containing the fibers classified by the classifying unit 40 is screened into a passed material that passes through the openings and a residue that does not pass through the openings. The screening unit 50 of the embodiment includes a mechanism that disperses the classified material by a rotary motion in the air. Then, the passed material passing through the openings by screening of the screening unit 50 is transferred from a passed material transferring unit 52 to the deposition unit 70 via a pipe 204. On the other hand, the residue that does not pass through the openings by screening of the screening unit 50 is returned again to the defibrating unit 30 via a pipe 205 as the defibration object. Thus, the residue is reused (recycled) without being discarded.

The passed material passing through the openings by screening of the screening unit 50 is transferred to the deposition unit 70 via the pipe 204 in the air. The passed material may be transferred from the screening unit 50 to the deposition unit 70 by a blower (not illustrated) generating the airflow or may also be transferred from the screening unit 50 on the upper side to the deposition unit 70 on the lower side by gravity. The additive agent feeding unit 60 is provided between the screening unit 50 and the deposition unit 70 in the pipe 204 to add the additive material such as binding resin (for example, thermoplastic resin or thermosetting resin) with respect to the passed material that is transferred. Moreover, as the additive material, for example, flame retardant, whiteness enhancer, sheet force strengthening agent, sizing agent, absorption modifier, fragrance, deodorant, and the like may be fed in addition to binding resin. These additive materials are stored in an additive material reservoir 61 and is fed from a feeding port 62 by a feeding mechanism (not illustrated).

The deposition unit 70 can deposit the material containing the fibers and deposits at least a part of the defibrated material that is defibrated by the defibrating unit 30 in the air. Specifically, the deposition unit 70 forms a web W by using and depositing the material containing the fibers and binding resin fed from the pipe 204, and includes a mechanism of uniformly dispersing the fibers in the air. In addition, the deposition unit 70 has a moving unit on which the defibrated material is deposited as a deposited material (web W) during moving. Moreover, the moving unit of the embodiment is configured of tension rollers 72 and an endless mesh belt 73 which is stretched by the tension rollers 72 and in which meshes are formed. Then, the mesh belt 73 is rotated (moved) in one direction by rotating at least one of the tension rollers 72. Moreover, the web W according to the embodiment refers to a configuration form of an object containing the fibers and binding resin. Thus, the web W is regarded as a web even if the form such as dimensions is changed during heating, during pressing, during cutting, during transferring, and the like of the web.

First, as the mechanism of uniformly dispersing the fibers in the air, a forming drum 71 into which the fibers and binding resin are fed is arranged in the deposition unit 70. Then, it is possible to uniformly mix binding resin (additive material) in the passed material (fiber) by driving the forming drum 71 to be rotated. A screen having a plurality of small holes is provided in the forming drum 71. Then, binding resin (additive material) is uniformly mixed in the passed material (fiber) and it is possible to uniformly disperse the fibers or the mixture of the fibers and binding resin passing through the small holes by driving the forming drum 71 to be rotated.

The mesh belt 73 is arranged below the forming drum 71. In addition, a suction device 75 is provided vertically below the forming drum 71 as a suction unit that generates the airflow vertically downward via the mesh belt 73. It is possible to suck the fibers dispersed in the air on the mesh belt 73 by the suction device 75.

Then, the fibers and the like passing through the screen having the small holes of the forming drum 71 are deposited on the mesh belt 73 by a suction force by the suction device 75. In this case, it is possible to form the web W that is deposited in an elongated shape containing the fibers and binding resin by moving the mesh belt 73 in one direction. The web W that is continuous in a strip shape is formed by dispersing the web W from the forming drum 71 and continuously moving the mesh belt 73. Moreover, the mesh belt 73 may be metal, resin, or nonwoven fiber, and may be any one if the fibers can be deposited and the airflow can pass through. Moreover, if a hole diameter of the mesh of the mesh belt 73 is too large, the fibers enters between meshes and the web W has unevenness when forming the web W (sheet), and if the hole diameter of the mesh is too small, it is difficult to stable airflow by the suction device 75. Thus, it is preferable that the hole diameter of the mesh is appropriately adjusted. The suction device 75 can be configured to form a closed box in which a window having desired sizes is opened blow the mesh belt 73 and which causes an inside of the box to be a negative pressure more than an external air by sucking air from an outside of the window.

The web W formed on the mesh belt 73 is transferred in the transfer direction (white arrows in the view) by moving the mesh belt 73 to be rotated. An intermediate transferring unit 90 as a peeling unit is arranged above the mesh belt 73. The web W is peeled from the mesh belt 73 by the intermediate transferring unit 90 and is transferred on a pressurizing unit 110 side. That is, the peeling unit (intermediate transferring unit 90) that peels the defibrated material (web W) from the moving unit (mesh belt 73) is provided and it is possible to transfer the peeled deposited material (web W) to the pressurizing unit 110. The intermediate transferring unit 90 is configured to transfer the web W while sucking the web W vertically upward (direction in which the web W is separated from the mesh belt 73). The intermediate transferring unit 90 is arranged to separate from the mesh belt 73 vertically upward (direction perpendicular to a surface of the web W) and a part thereof is arranged to be shifted to the mesh belt 73 on a downstream side in the transfer direction of the web W. Then, a transfer section of the intermediate transferring unit 90 is a section from a tension roller 72a on a downstream side of the mesh belt 73 to the pressurizing unit 110.

The intermediate transferring unit 90 has a transfer belt 91, a plurality of tension rollers 92, and a suction chamber 93. Transfer belt 91 is an endless mesh belt which is tensioned by the tension rollers 92 and in which meshes are formed. Then, transfer belt 91 is rotated (moved) in one direction by rotating at least one of the plurality of the tension rollers 92.

The suction chamber 93 is arranged on an inside of transfer belt 91, is a hollow box shape having an upper surface and four side surfaces coming into contact with the upper surface, and a bottom surface (surface facing transfer belt 91 positioned below) thereof is opened. In addition, the suction chamber 93 includes a suction unit that generates the airflow (suction force) to an inside of the suction chamber 93. Then, an inner space of the suction chamber 93 is sucked by driving the suction unit and air flows into the suction chamber 93 from the bottom surface thereof. Thus, the airflow generates upward the suction chamber 93, the web W is sucked from above the web W, and then it is possible to suck the web W to transfer belt 91. Then, transfer belt 91 is moved (orbited) by rotating the tension rollers 92 and it is possible to transfer the web W to the pressurizing unit 110. In addition, a part of the suction chamber 93 overlap the mesh belt 73 and the suction chamber 93 is arranged at a position on a downstream side on which the suction chamber 93 does not overlap the suction device 75. Thus, the web W on the mesh belt 73 is peeled from the mesh belt 73 at a position facing the suction chamber 93 and can be sucked to transfer belt 91. The tension rollers 92 rotate by moving transfer belt 91 at the same speed as that of the mesh belt 73. If there is a difference between the speeds of the mesh belt 73 and transfer belt 91, it is possible to prevent the web W from cutting or buckling by being stretched by causing the mesh belt 73 and transfer belt 91 to be the same speed.

The pressurizing unit 110 is arranged on the downstream side of the intermediate transferring unit 90 in the transfer direction of the web W. The pressurizing unit 110 is configured of a pair of pressurizing rollers 111 and 1112, and presses the transferred web W. For example, the web W is pressed by the pressurizing unit 110 such that a thickness of the web W becomes approximately ⅕ to ⅓₀ of a thickness of the web W formed by the deposition unit 70. Thus, it is possible to improve strength of the web W.

A heating and pressurizing unit 120 is arranged on the downstream side of the pressurizing unit 110 in the transfer direction of the web W. The heating and pressurizing unit 120 heats and presses the web W as the deposited material that is deposited by the deposition unit 70. The heating and pressurizing unit 120 binds the fibers contained in the web W via binding resin. The heating and pressurizing unit 120 of the embodiment is configured of a pair of heating rollers 121 and 122. A heating member such as a heater is provided in a center portion of a rotational shaft of each of the heating rollers 121 and 122. It is possible to heat and press the transferred web W by allowing the web W to pass through between the pair of the heating rollers 121 and 122. Then, the web W is heated and pressed by the pair of the pressurizing rollers 121 and 122 and then the fibers are easily entangled with melted binding resin, a distance between the fibers is shortened, and contact points between the fibers are increased.

A first cutting unit 130a that cuts the web W in the transfer direction of the web W and a second cutting unit 130b that cuts the web W in a direction intersecting the transfer direction of the web W are arranged on the downstream side of the heating and pressurizing unit 120 as a cutting unit 130 that cuts the web W. The first cutting unit 130a is, for example, a slitter and cuts the web W according to a predetermined cutting position in the transfer direction of the web W. The second cutting unit 130b is, for example, a rotary cutter and cuts the continuous web W in a sheet form according to a cutting position that is set to be a predetermined length. Thus, a sheet Pr (web W) of a desired size is formed. The cut sheet Pr is mounted on a stacker 160 and the like. Moreover, the web W may be configured to be wound by a winding roller in the continuous shape. As described above, it is possible to manufacture the sheet Pr in the sheet manufacturing apparatus 1.

Moreover, the sheet according to the above-described embodiment mainly refers to those in a sheet shape in which the material containing the fibers such as the waste paper and pure pulp is the raw material. However, the sheet is not limited to the sheet shape and may be a board shape or a web shape (or a shape having unevenness). Furthermore, as the raw material, plant fibers such as cellulose, chemical fibers such as polyethylene terephthalate (PET) and polyester, and animal fibers such as wool and silk may be included. In the present specification, the sheet is divided into paper and non-woven fabric. Paper includes aspects formed in a thin sheet shape and includes recording paper for writing or printing, wallpaper, wrapping paper, colored paper, Kent paper, and the like. Since non-woven fabric has a thickness thicker than that of paper or has strength lower than that of paper, the non-woven fabric, fiber board, tissue paper, kitchen paper, cleaner, filter, liquid absorption material, sound-absorbing material, cushioning material, mat, and the like are included.

The waste paper in the above-described embodiment indicates mainly printed paper and it is regarded as the waste paper if the raw material is formed as paper regardless whether or not paper is used.

As described above, according to the embodiment, it is possible to obtain the following effects.

The plurality of the removing units 300 (300a to 300h) including the protrusions 301 are provided in the feeding unit 10 and the removing units 300 (300a to 300h) are arranged so as to overlap in the first and second transfer directions W1 and W2 of the waste paper Pu. Thus, the opportunity to remove the binder attached to the waste paper Pu is increased. Thus, it is possible to improve the binder removal rate from the waste paper Pu. Then, it is possible to reduce damage of the crushing blades 21 of the crushing unit 20 and the like by the binder.

Fourth Embodiment

Next, a configuration of the paper supplying device will be described. The paper supplying device includes a stacking unit that stacks paper, a transferring unit that transfers paper stacked in the stacking unit from the lowermost paper, and removing units that remove a binder bundling paper. A plurality of the removing units are provided so as to overlap in a transfer direction of paper along a transfer path of paper by the transferring unit.

Figure 7:
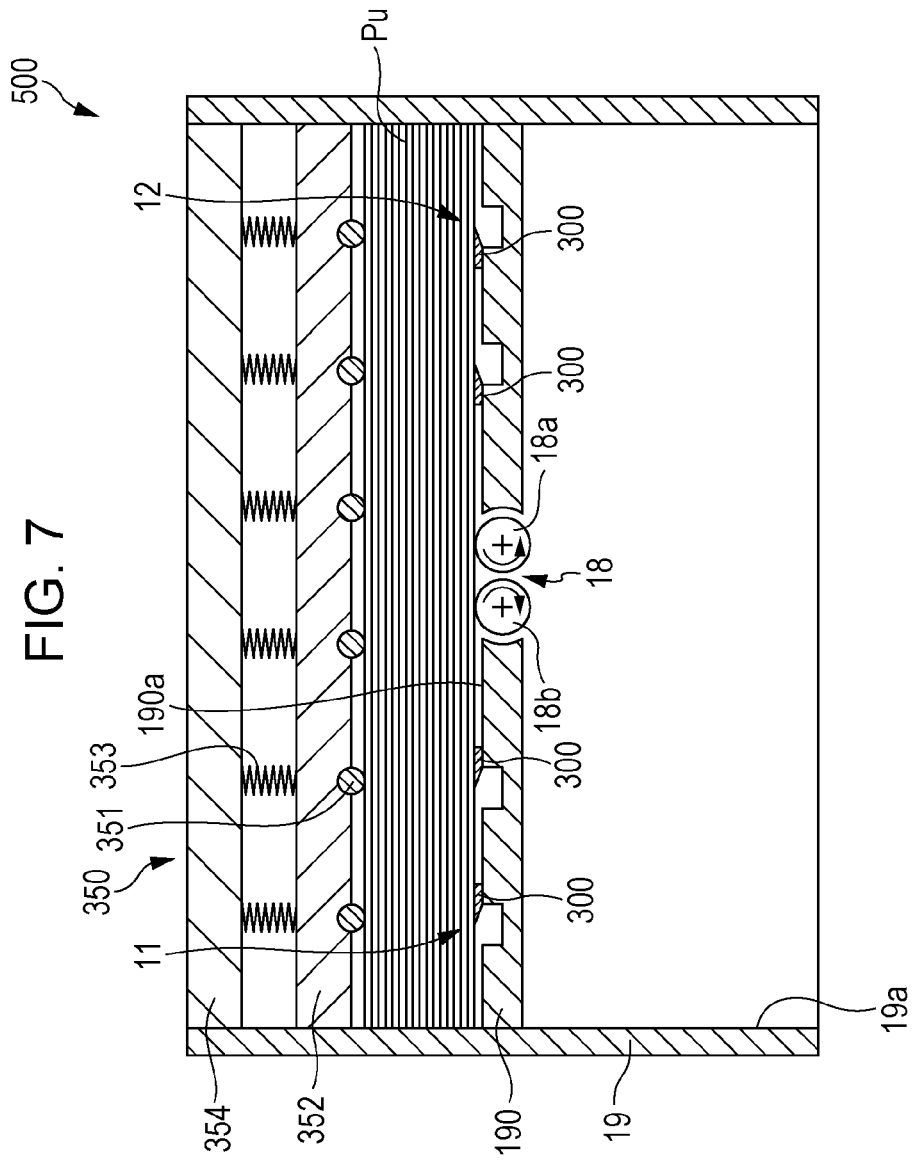
FIG. 7 is a schematic view illustrating a configuration of a paper supplying device according to a fourth embodiment.

FIG. 7 is a schematic view (side sectional view) illustrating the configuration of the paper supplying device. As illustrated in FIG. 7, a paper supplying device 500 includes a stacking unit 11, a pair of rollers 18 as a transferring unit, a removing unit 300, and the like. Moreover, the paper supplying device 500 of the embodiment is configured to omit the cutting unit 20 (and the receiving unit 201a, and the pipe 201) from the paper shredding device 10 according to the first embodiment. Thus, since configurations of the stacking unit 11, the pair of rollers 18, the removing unit 300, and the like are the same those configurations according to the paper shredding device 10, description will be omitted.

In the paper supplying device 500, paper (waste paper) Pu stacked in the stacking unit 11 is transferred (supplied) from an opening port 19a via the removing unit 300 through the pair of rollers 18.

As described above, according to the embodiment, it is possible to obtain the following effects.

The plurality of the removing units 300 (300a to 300h) including the protrusions 301 are provided and the removing units 300 (300a to 300h) are arranged so as to overlap in the first and second transfer directions W1 and W2 of the waste paper Pu. Thus, the opportunity to remove the binder attached to the waste paper Pu is increased. Thus, the binder removal rate from the waste paper Pu is improved and it is possible to supply (transfer) the waste paper Pu in which the binder is removed to another unit or device.

The invention is not limited to the embodiments described above and it is possible to add various modifications and improvements to the embodiments described above. The modification examples are as fellows. The modification examples may be combined.

Modification Example 1

Figure 8:
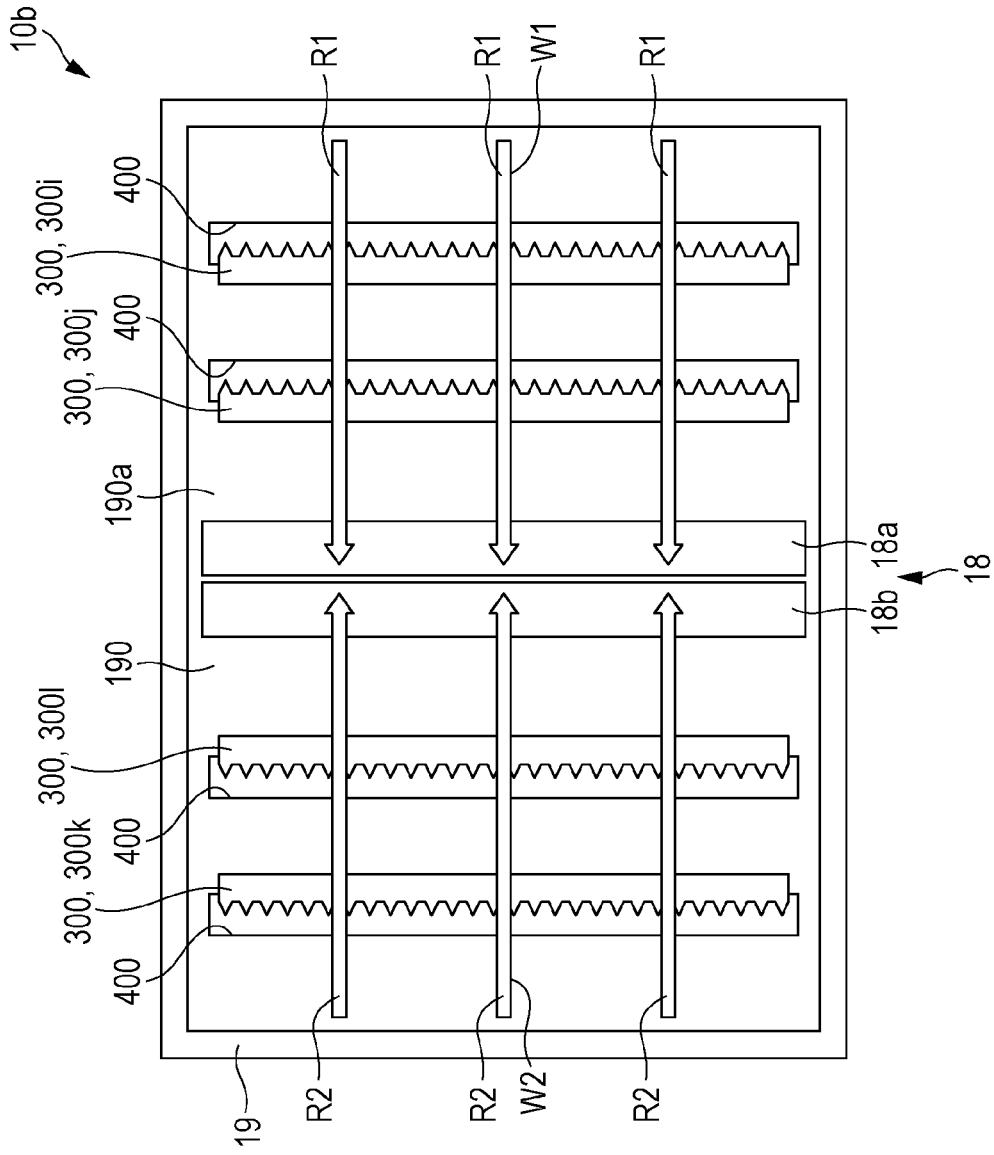
FIG. 8 is a schematic view illustrating a configuration of a paper shredding device (feeding unit) according to Modification Example 1.

In the above-described embodiments, the removing units 300 (300a to 300h) are arranged so as to incline in the first and second transfer directions W1 and W2, but the invention is not limited to the configuration. FIG. 8 is a schematic view illustrating a configuration of a paper shredding device (feeding unit) according to Modification Example 1. As illustrated in FIG. 8, a plurality of removing units 300 (300i to 300l) are arranged in a paper shredding device 10b. The removing units 300 (300i to 300l) are arranged so as to substantially orthogonal to the first and second transfer directions W1 and W2. Specifically, the removing unit 300i and the removing unit 300j are arranged so as to substantially orthogonal to the first transfer direction W1. Moreover, the removing unit 300i and the removing unit 300j are arranged so as to overlap in the first transfer direction W1. In addition, the removing unit 300k and the removing unit 300l are arranged so as to substantially orthogonal to the second transfer direction W2. Moreover, the removing unit 300k and the removing unit 300l are arranged so as to overlap in the second transfer direction W2. Even in this case, the opportunity to remove the binder attached to the waste paper Pu is increased, and it is possible to improve the binder removal rate from the waste paper Pu.

Modification Example 2

Figure 9:
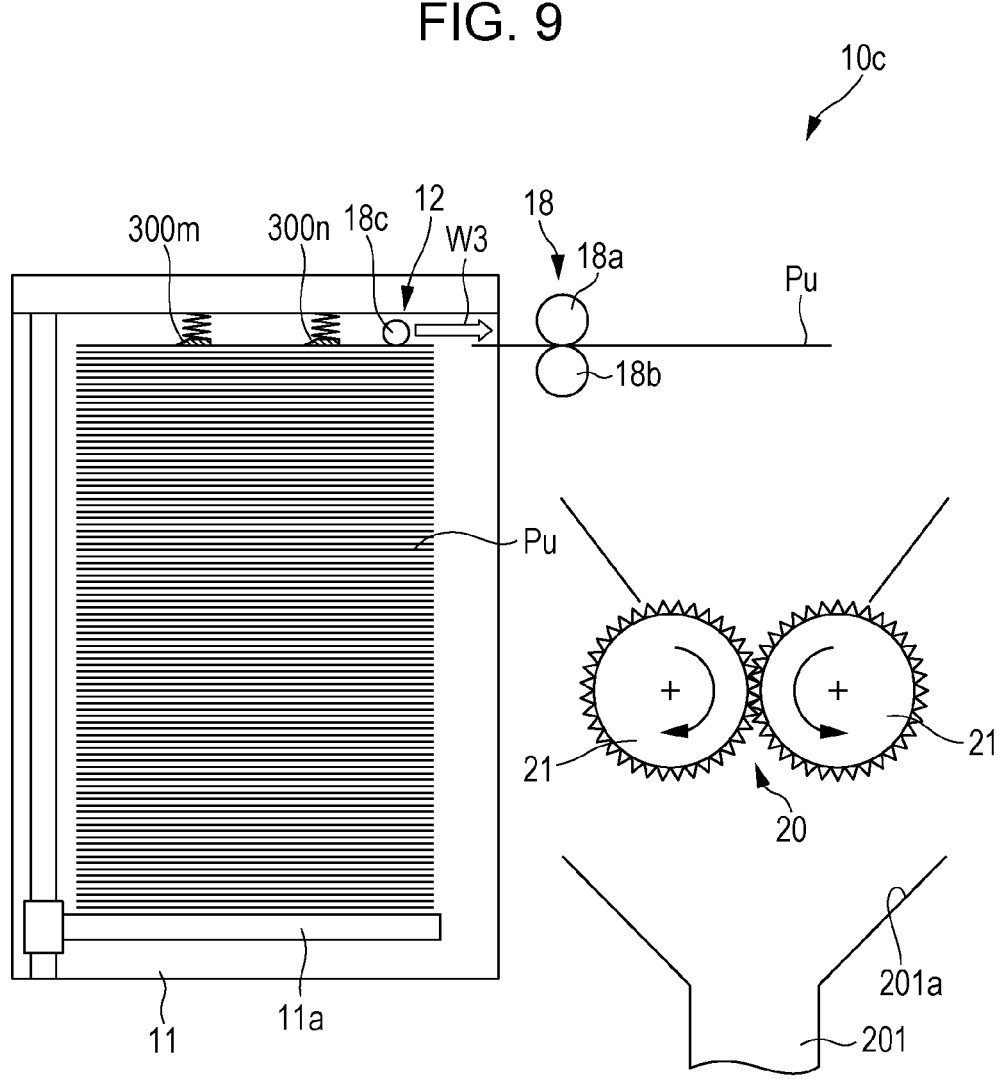
FIG. 9 is a schematic view illustrating a configuration of a paper shredding device (feeding unit) according to Modification Example 2.

In the paper shredding devices (feeding unit) 10 and 10a of the above-described embodiments, the stacking unit 11, the supplying unit 12, the cutting unit (crushing unit) 20, and the like are configured as one unit, but the invention is not limited to the configuration. FIG. 9 is a schematic view illustrating a configuration of a paper shredding device (feeding unit) according to Modification Example 2. As illustrated in FIG. 9, in a paper shredding device (feeding unit) 10c, a stacking unit 11, a supplying unit 12, a cutting unit (crushing unit) 20, and the like are individually arranged. Specifically, a tray unit 11 as the stacking unit 11, which is able to stack a plurality of waste paper Pu is provided. Then, the tray unit 11 stacks the waste paper Pu and includes a moving unit 11a that is able to be lifted and lowered. In addition, a plurality of removing units 300 (in the modification example, two removing units 300m and 300n) are arranged in an upper end portion of the waste paper Pu stacked in the tray unit 11. In addition, the removing units 300m and 300n are arranged so as to overlap in a transfer direction W3 of the waste paper Pu. In addition, a pickup roller 18c configuring a transferring unit is arranged above the tray unit 11. The waste paper Pu is transferred in the transfer direction W3 by rotation of the pickup roller 18c. In this case, binder attached to the waste paper Pu is removed by the removing units 300m and 300n. Furthermore, a pair of rollers 18 are arranged on a downstream side of the pickup roller 18c in the transfer direction W3. Then, the waste paper Pu is transferred to a cutting unit (crushing unit) 20 by the pair of the rollers 18 and is cut into pieces of paper. The cut crushed pieces are received by a receiving unit 201a and is supplied to a defibrating unit 30 via a pipe 201, for example, in a case of the sheet manufacturing apparatus 1. Even in this case, it is possible to obtain the same effects as the above-described effects.

Modification Example 3

Figure 10:
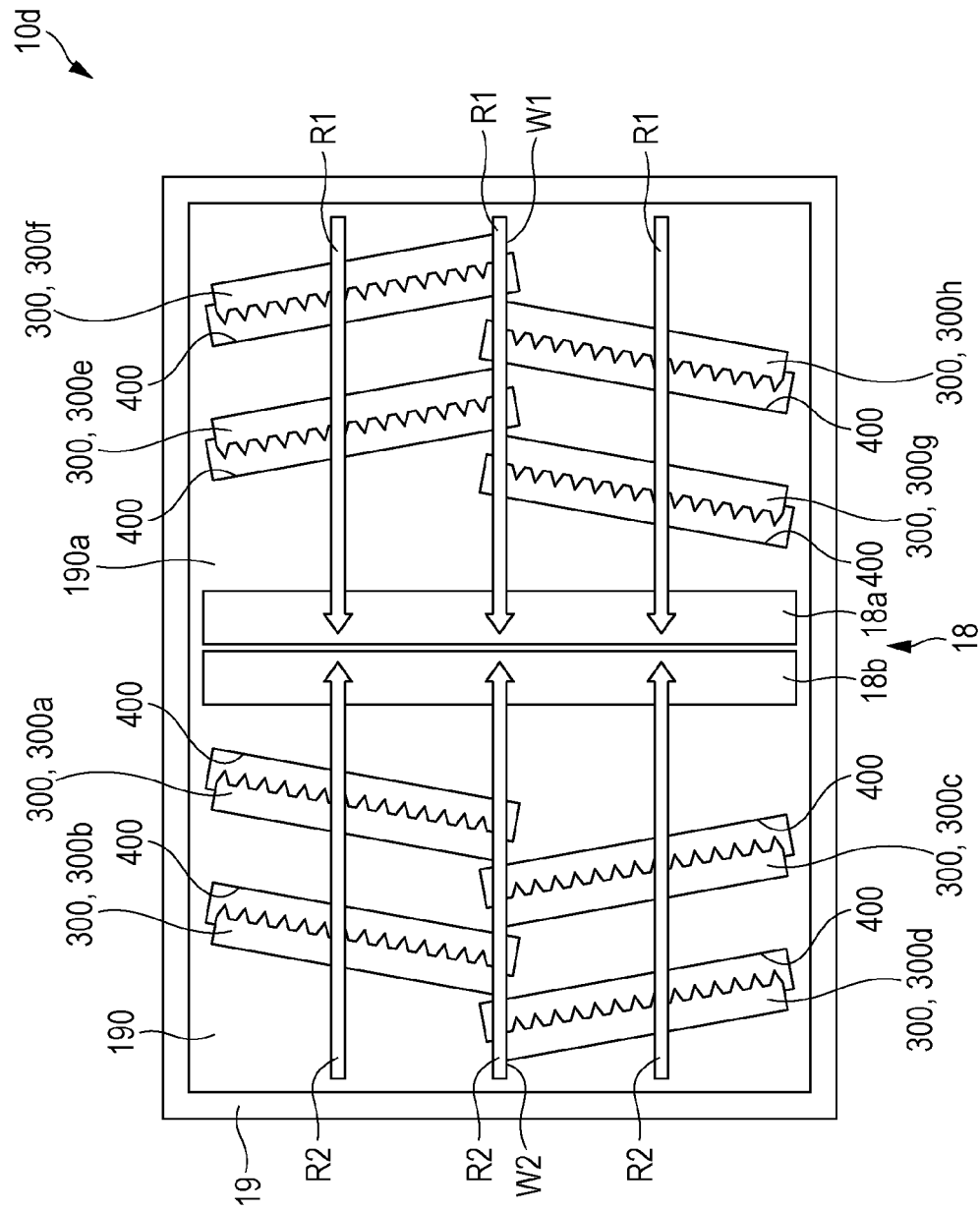
FIG. 10 is a schematic view illustrating a configuration of a paper shredding device (feeding unit) according to Modification Example 3.

In the above-described embodiment, the removing units 300 (300a to 300h) are arranged such that the end portions on the inside of each of the removing units 300 (300a to 300h) is inclined more than the end portion on the outside thereof on the downstream side (so as to close to the pair of the rollers 18) in the first and second transfer directions W1 and W2, but the invention is not limited to the configuration. Here, the end portion on the inside of each of the removing units 300 (300a to 300h) is the end portion that is positioned in the center of the waste paper Pu in the width direction (direction intersecting the transfer direction) and the end portion on the outside is the end portion that is positioned in the side end portion of the waste paper Pu in the width direction. FIG. 10 is a schematic view illustrating a configuration of a paper shredding device (feeding unit) according to Modification Example 3. As illustrated in FIG. 10, removing units 300 (300a to 300h) of a paper shredding device 10d may be arranged such that an end portion on an inside of each of the removing units 300 (300a to 300h) is inclined more than an end portion on an outside thereof on an upstream side (so as to separate away from a pair of rollers 18) in the first and second transfer directions W1 and W2. That is, the end portion may be inclined in a direction opposite to the inclining direction of each of the removing units 300 (300a to 300h) of the paper shredding device 10 of the first embodiment. Even in this case, it is possible to obtain the same effects as the above-described effects.

Modification Example 4

Figure 11:
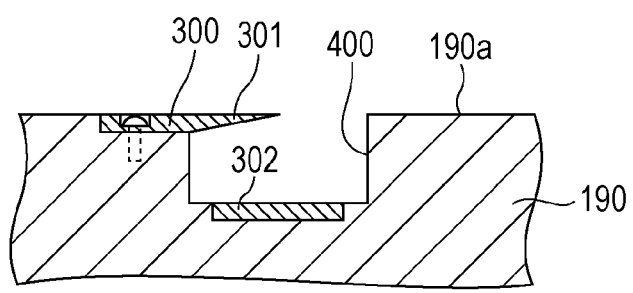
FIG. 11 is a sectional view illustrating a part of a configuration of a removing unit according to Modification Example 4.

In the above-described embodiment, the removing units 300 (300a to 300h) are arranged on the mounting surface 190a and are arranged such that a top portion of the removing unit 300 (protrusion 301) is higher than the mounting surface 190a on the upper side, but the invention is not limited to the configuration. FIG. 11 is a sectional view illustrating a part of a configuration of a removing unit according to Modification Example 4. As illustrated in FIG. 11, a removing unit 300 and a mounting surface 190a may be arranged so as to be one surface. In this case, for example, a concave unit is formed in a part of a partition unit 190 and the removing unit 300 may be arranged in the concave unit. Thus, since a step due to the removing unit 300 and the mounting surface 190a is not present, it is possible to smoothly transfer the waste paper Pu.

Furthermore, as illustrated in FIG. 11, a magnet 302 may be arranged on a bottom portion of the concave unit of a storage unit 400. Thus, the binder containing a magnetic body removed by the removing unit 300 can be captured and it is possible to prevent scattering of the binder.

Modification Example 5

The removing unit 300 of the above-described embodiment is provided with the protrusion 301 in all the removing units 300a to 300h, but the protrusion 301 may be provided in only one of two removing units 300 overlapping in the first and second transfer directions W1 and W2. For example, the protrusions 301 are provided in the removing units 300a, 300c, 300e, and 300g that are positioned on the upstream side, and the removing units 300b, 300d, 300f, and 300h that are positioned on the downstream side may be edges without the protrusions 301.

Modification Example 6

The removing unit 300 of the above-described embodiment is integrally formed with the partition unit 190, but the removing unit 300 may be detachably (replaceably) mounted on the partition unit 190. For example, the removing unit 300 may be fixed to the partition unit 190 by a fastener such as a screw or may be fixed to the partition unit 190 by a snap-fit structure. Thus, the partition unit 190 is easily manufactured. In addition, since the removing unit can be replaced, for example, maintenance such as replacement can be performed when the removing unit is damaged. Furthermore, removing units which are different in shapes, sizes, and the like are prepared and it is possible to appropriately use the removing unit by being replaced.

The entire disclosure of Japanese Patent Application No. 2015-002938, filed Jan. 9, 2015 and 2015-218094, filed Nov. 6, 2015 are expressly incorporated by reference herein.

What is claimed is:

1. A paper shredding device comprising:
   a stacking unit configured to stack paper;
   a cutting unit configured to cut paper supplied from the stacking unit;
   a transferring unit configured to transfer paper from the stacking unit to the cutting unit; and
   removing units configured to remove a binder attached to paper,
   wherein the removing units are provided so as to overlap in a transfer direction of paper along a transfer path of paper from the stacking unit to the cutting unit.

2. The paper shredding device according to claim 1, wherein the removing units are provided in a direction intersecting the transfer direction and are alternately arranged.

3. The paper shredding device according to claim 1, wherein the at least one removing unit has a plurality of protrusions and at least one of the protrusions is formed to abut the binder.

4. The paper shredding device according to claim 1, wherein the at least one removing unit has protrusions and the protrusions are provided at a pitch of equal to or less than half an inner width of the binder.

5. The paper shredding device according to claim 1, wherein a first removing unit and a second removing unit, which are arranged so as to overlap in the transfer direction, respectively have protrusions, and
wherein the protrusions of the first removing unit and the protrusions of the second removing unit are arranged so as to be alternately positioned.

6. The paper shredding device according to claim 1, wherein the removing units are provided to incline in the transfer direction.

7. The paper shredding device according to claim 1, further comprising:
   a receiving unit configured to receive pieces of paper that are cut by the cutting unit; and
   a storage unit configured to store the binder removed by the removing units.

8. The paper shredding device according to claim 1, wherein the removing units are detachably fixed.

* * * * *